United States Patent Office 3,499,857
Patented Mar. 10, 1970

3,499,857
THERMOPLASTIC RESINOUS COMPOSITIONS, PARTICULARLY USING UNSATURATED TRIGLYCERIDES
Charles Edwin Searight and John Robert Ryan, Jackson, and Bernie Joseph Davis, Biloxi, Miss., assignors to Cataphote Corporation, Jackson, Miss., a corporation of Ohio
No Drawing. Filed Apr. 17, 1967, Ser. No. 631,161
Int. Cl. C08f *41/12, 19/14*
U.S. Cl. 260—23.7
9 Claims

ABSTRACT OF THE DISCLOSURE

Disclosed is a thermoplastic resinous composition particularly suitable for traffic marking. The composition is a copolymer of a non-conjugated ethylenically unsaturated fatty oil with a mono- or di-ethylenically unsaturated hydrocarbon having 4 to 5 carbons and with a vinyl monomer.

---

This invention relates to resinous polymers and more particularly this invention is concerned with thermoplastic resinous polymeric materials having physical properties which make them particularly suitable as binders in traffic markers. The invention includes new thermoplastic resins and their production as well as highway marking compositions using the resins.

A satisfactory highway marking composition adapted for hot melt application is difficult to obtain since a number of properties are of great importance, some of which must be compromised in favor of others. Some of the most desirable characteristics of a hot melt resin are that it should (1) be stable at operating temperature; (2) have stable temperature-viscosity characteristics on reheating; (3) rapidly solidify; (4) not release injurious fumes from the hot melt; (5) have high impact resistance; (6) have a high reflectance; (7) have good bond strength; (8) have good ultra-violet light resistance; (9) have good indentation resistance; and (10) have low tackiness at ambient temperatures.

Prior to the present invention, the resinous portion of traffic marking compositions commonly used consisted of blends of various commercial resins such as natural resins, ester gums, rosin maleics, rosin modified phenolics, ethyl cellulose, etc., plasticized with oils, blown castor oil or other permanent plasticizers, or in some cases 100% solid alkyd resins have been used as the resinous portion. All of these resins have certain defects. The resins based on blends change in character when heated to elevated temperatures during application. In addition, many blends are amber in color and clean whites cannot be made from them. Another difficulty has been that the amount of plasticizer needed to obtain proper impact resistance, against heavy trucks for example, gives a traffic marking stripe which has excessive tackiness and dirt collection in hot weather. Alkyd type resins have better color, but tackiness, even at normal temperatures, is pronounced. When attempts to remove this tack by over-pigmentation are made, the material has poor flow characteristics.

The present invention provides hot melt type resin traffic marking materials which have good ultra-violet light color stability and viscosity stability during long holds while molten. The resins have low tack properties in hot weather, and need little or no plasticization. The resins have particularly desirable pigment wetting and flow properties, resulting in stripes with smooth, attractive surfaces.

In accordance with the present invention, a solid thermoplastic resin for the production of highway marking stripes by hot melt application is produced by combining large proportions of a monoethylenically unsaturated monomer with a substantial amount of a non-conjugated ethylenically unsaturated fatty oil with a small amount of a polymer having a molecular weight of 8,000 to 30,000.

More particularly, there is provided a solid thermoplastic resin comprising (1) the adduct of a nonconjugated ethylenically unsaturated fatty oil with a polymer of the group of (a) a homopolymer of a mono- ordi-ethylenically unsaturated hydrocarbon containing 4 or 5 carbons, (b) a copolymer of at least two mono- or di-ethylenically unsaturated hydrocarbons containing 4 or 5 carbons, or (c) a mixture of homopolyemrs and/or copolymers as defined in (a) and (b), said homopolymers and copolymers having a molecular weight of about 8,000 to 30,000, copolymerized with (2) a vinyl monomer of the group consisting of styrene, halogen and $C_1$ to $C_4$ alkyl-substituted styrene and methyl methacrylate.

Advisably, the amount of homopolymer and/or copolymer used is about 2% to 8% by weight based on the fatty oil and the vinyl monomer advisably constitutes about 50% to 90% by weight of the resin.

Among the polymers which can be used in forming the resin are homopolymers such as poly-1,3-pentadiene, polyisobutylene, polyisoprene and polybutadiene and copolymers such as copolymers of isobutylene with isoprene, butadiene or 1,3-pentadiene. The polymers having average molecular weights of 8,000 to 30,000 used in this invention are generally liquids at ambient temperature. The most suitable molecular weight range is about 8,000 to 15,000. Also, the polymer considered most suitable for use in the invention is polybutadiene, and especially a polybutadiene having about 80% 1,4-butadiene and 20% 1,2-butadiene linkages.

Specific vinyl monomers which can be used include styrene, monochlorostyrene, vinyl xylene, isopropyl styrene, alpha-methyl styrene and methyl methacrylate. The vinyl monomer can be modified by replacing 5 to 10% of it with modifying monomers such as butyl methacrylate, 2-ethylhexyl acrylate, etc., but the resin does not require such modification because of its internal flexibility, imparted by the linearity and high molecular weight of the polymer used. It is essential to employ large proportions of one or more of the preferred vinyl monomers. When less than 50% of vinyl monomer (based on the total resin) is used, the resin is unduly soft. As a practical matter, the proportion of the preferred vinyl monomer is maximized to 90% of the total resin weight. In the preferred practice of the invention, the weight ratio of vinyl monomer to fatty oil is at least 1.8:1 and the vinyl monomer constitutes from 60 to 85% by weight of the final thermoplastic resin.

Any non-conjugated drying oil, including semi-drying oils, may be used. It is preferred to employ oils which are triglycerides of unsaturated fatty acids, but unsaturated fatty acid esters of aliphatic polyols other than glycerine may be used, such as tall oil esters of pentaeythritol or trimethylol propane. Preferred oils are illustrated by safflower oil, linseed oil, perilla oil, soya oil and sunflower oil. Since the specific oil used is of secondary significance, the selection is based largely on cost and availability. The unsaturated fatty acids themselves are not useful in the invention, though small amounts may be tolerated. The use of small percetnages of conjugated oils can also be tolerated.

Particularly satisfactory resins can be made from the following ranges of ingredients:

| | Percent by weight |
|---|---|
| Non-conjugated ethylenically unsaturated fatty oil | 12–35 |
| Polymer | 2–8 |
| Monoethylenically unsaturated monomer | 60–85 |

In producing the thermoplastic resin of this invention, it is advisable to first form an adduct of the polymer and the fatty oil and to then react the adduct with the vinyl monomer.

The adduct is conveniently produced by forming a mixture of the fatty oil and polymer and heating it to an elevated temperature such as about 300–425° F. for a short time such as 15 to 45 minutes.

The adduct reacts readily with the vinyl monomer at an elevated temperature of about 325–450° F. with the use of a polymerization catalyst such as di-tertiary butyl peroxide. The polymerization is generally completed in about 0.5 to 2 hours. The product obtained is a solid resinous mass after cooling.

The invention is particularly directed to normally solid highway marking compositions adapted for hot melt application and which are constituted by the solid thermoplastic resins described hereinbefore which have been pigmented and filled and which preferably also include particles which will provide a reflex reflectant action in a stripe formed by the application of the composition to a pavement.

The highway marking compositions contain at least 10%, preferably at least 12%, by weight of a pigment of which titanium dioxide is representative, and at least 15% by weight of reflex reflectant particles, preferably at least 20% by weight. Preferably, the reflex reflectant particles are glass beads having a refractive index of at least 1.50 tested by the liquid immersion method at 25° C., the beads desirably having a size variation such that not more than 10% will pass through a No. 70 sieve and at least 95% will pass through a No. 40 sieve. While glass beads are preferred, other particulate materials of high refractive index may be used.

The inclusion of a filler, preferably finely divided silica, calcium carbonate or talc is also desirable although these materials can supply pigmentation as well as function as fillers.

When colors are desired, a dye such as benzidene yellow or benzidene orange may be used.

The incorporation of pigment, filler, glass beads or other reflex reflectant particles, dyes, etc. into the thermoplastic resin is simply effected by melting the resin and incorporating the desired components using simple mixing or ball milling if more uniform distribution is desired. When ball milling or other dispersing technique is used, the reflex reflectant particles are mixed in as a last component.

The solid thermoplastic traffic stripe composition is applied to pavements as a hot melt which solidifies rapidly under ambient conditions permitting traffic to use the striped surface within a very short time following application. Moreover, very thick stripes may be applied up to about ¼ inch in thickness, in a single application providing a long lasting stripe which retains its reflex reflectance quality over long period of time and despite vehicular abrasion and exposure to the elements. Since hot melt application of normally solid thermoplastic materials is a matter of common knowledge in the art, a more detailed discussion of this well known technique is not presented.

The following examples are presented to illustrate the invention.

EXAMPLE 1

To a reaction kettle equipped with stirrer, inert gas blanket, sparge line for inert gas and steam, thermometer and condenser, is charged 810 parts by weight of non-conjugated sunflower oil and 90 parts of polybutadiene (about 80% 1,4-butadiene and 20% 1,2-butadiene) having a molecular weight of 10,000–12,000. The kettle is purged free of oxygen with an inert gas and the mixture then heated to 350° F. and held at this temperature for 20 minutes. To the mixture is then added a premix of 2100 parts by weight of styrene monomer and 21 parts by weight of di-tertiary butylperoxide at a rate to maintain a temperature of 350 to 370° F. Addition should be completed in 1.5 to 2 hours wtih the heat off.

After 0.1 of the monomer has been added, addition is discontinued since the reaction will initiate and an exotherm will occur. Cooling water is used in the jacket to keep the exotherm at a 370° F. maximum. When the exotherm subsides, addition of the monomer is continued at a rate to maintain the reaction temperature at between 350 to 370° F. When all ingredients are in, the mixture is held for 0.5 hour at 370° F., sparged with inert gas to 425° F. and then steam sparged to 480° F. and the heat cut off. Then 1.5 parts of a stabilizer such as Irganox 1010 (Geigy), a high molecular weight hindered polyphenol, M.P. 120° C., and 15 parts of triphenyl phosphite are added Irganox 1010 chemically is tetrakis [methylene 3-(3',5',5' - di-t-butyl - 4' - hydroxyphenyl)propionate] methane. This process yields a resin with the following characteristics:

| | |
|---|---|
| Softening point °F | 160 |
| Specific gravity | 0.9524 |
| Gardner color | <¼ |
| Acid No. | 0 |
| Iodine No. | 47 |
| Melt viscosity at— | |
| 150° C. cps | 1750 |
| 200° C. cps | 275 |
| 250° C. cps | 120 |
| Yield percent | 97 |

A similar resin is obtained using safflower oil in place of sunflower oil.

EXAMPLE 2

A solid thermoplastic resin is prepared as in Example 1 using 22 parts by weight of sunflower oil, 5 parts by weight of polyisobutylene, molecular weight 18–22,000, 62 parts by weight of styrene and 11 parts by weight of alpha-methyl styrene. The resin produces a high quality traffic marking composition with the exception the marker will be very hard.

EXAMPLE 3

A white highway marking composition utilizing the resin of Example 1 is prepared as follows:

| | Parts by weight |
|---|---|
| Resin of Example 1 | 20 |
| Anatase titanium dioxide | 13 |
| Glass beads | 25 |
| Crushed calcium carbonate | 20 |
| 50–70 mesh sand | 13 |
| Amorphous silica | 4 |
| Talc | 5 |

The resin of Example 1 is melted and heated to 350° to 400° F. The pigment, glass beads and fillers are added as rapidly as possible while maintaining the temperature at about 350° F. When the mixture is homogeneously pigmented and the glass spheres and fillers are thoroughly intermixed, the mixture is drawn off into conveniently shaped boxes and allowed to cool into solid bricks. The traffic stripe composition has the following characteristics—

Ball and ring softening point (ASTM E28–51T): 200–210° F.

Impact resistance: Greater than 15 inch-pounds.

Bond and strength: Greater than 180 pounds per square inch (Shore durometer, ASTM D1706–59T).

Indentation resistance: Minimum, 60 at 115° F.; 95 at 77° F.; 95 at 40° F.

Yellowness index after one hundred hours exposure to ultra-violet light: less than 0.012. Tackiness, none. Toxic fumes on heating, none.

EXAMPLE 4

A yellow traffic marking composition is prepared from the following:

| | Parts by weight |
|---|---|
| Resin from Example 2 | 25 |
| Rutile-titanium dioxide | 2 |
| Benzidene yellow | 1.5 |
| Benzidene orange | 0.8 |
| Crushed calcium carbonate | 20 |
| 50–70 mesh sand | 9 |
| Amorphous silica | 4 |
| Talc | 5 |
| Glass beads | 20 |

The composition is made by the procedure of Example 3. The composition is a superior yellow thermoplastic striping material having essentially the same properties indicated in Example 2 except for its yellow color.

Various changes and modifications of the invention can be made and, to the extent that such variations incorporate the spirit of this invention, they are intended to be included within the scope of the appended claims.

What is claimed is:

1. A solid thermoplastic resin comprising (1) the adduct of a non-conjugated ethylenically unsaturated fatty oil with (a) a homopolymer of a mono- or di-ethylenically unsaturated hydrocarbon containing 4 or 5 carbons, (b) a copolymer of at least two mono- or di-ethylenically unsaturated hydrocarbons containing 4 or 5 carbons or (c) a mixture of homopolymers and/or copolymers as defined in (a) and (b), said homopolymers and copolymers having a molecular weight of about 8,000 to 30,000, copolymerized with (2) a vinyl monomer of the group of styrene, halogen and $C_1$ to $C_4$ alkyl-substituted styrene and methyl methacrylate, said vinyl monomer constituting at least 50% by weight of the resin.

2. A resin according to claim 1 in which the amount of homopolymer and/or copolymer is about 2 to 8% by weight based on the fatty oil, and the vinyl monomer constitutes about 50 to 90% by weight of the resin.

3. A resin according to claim 1 in which the fatty oil is a triglyceride of unsaturated fatty acids or unsaturated fatty acid esters of aliphatic polyols other than glycerine.

4. A resin according to claim 1 in which the homopolymer is poly-1,3-pentadiene, polyisobutylene, polyisoprene or polybutadiene and the copolymer is a copolymer of isobutylene with isoprene, butadiene or 1,3-pentadiene.

5. A solid theromoplastic resin comprising (1) the adduct of a non-conjugated ethylenically unsaturated fatty oil with about 2 to 8%, based on the weight of the fatty oil, of (a) a homopolymer of a mono- or di-ethylenically unsaturated hydrocarbon containing 4 or 5 carbons, (b) a copolymer of at least two mono- or di-ethylenically unsaturated hydrocarbons containing 4 or 5 carbons or (c) a mixture of homopolymers and/or copolymers as defined in (a) and (b), said homopolymers and copolymers having a molecular weight of about 8,000 to 30,000, copolymerized with (2) a vinyl monomer of the group of styrene, halogen and $C_1$ to $C_4$ alkyl-substituted styrene and methyl methacrylate, said vinyl monomer constituting about 50 to 90% by weight of the resin.

6. A resin according to claim 5 in which the fatty oil is safflower oil or sunflower oil, a homopolymer of polybutadiene is used and the vinyl monomer is styrene or alpha-methylstyrene.

7. A highway marking composition comprising a resin according to claim 1 admixed with a pigment, reflex reflectance particles and a filler.

8. A highway marking composition comprising a resin having dispersed therein a filler, a pigment and reflex reflectance particles, said resin comprising an adduct of sunflower oil or safflower oil with polybutadiene, copolymerized with an amount of styrene or alpha-methyl styrene constituting at least 50% by weight of the resin.

9. A highway marking composition according to claim 8 in which in the resin the polybutadiene is about 2 to 8% of the sunflower oil or safflower oil and the styrene or alpha-methyl styrene constitute about 50 to 90% by weight of the resin.

References Cited

UNITED STATES PATENTS 3,228,900   1/1966   Spellberg et al. _____ 260—23

DONALD E. CZAJA, Primary Examiner

D. J. BARRACK, Assistant Examiner

U.S. Cl. X.R.

96—1.5; 260—23, 45.95